(12) United States Patent
Ueda et al.

(10) Patent No.: US 11,923,152 B2
(45) Date of Patent: Mar. 5, 2024

(54) ELECTROLYTIC CAPACITOR COMPRISING AN ANODE BODY HAVING A POROUS STRUCTURE AND CONTAINING A METAL

(71) Applicant: Panasonic Intellectual Property Management Co., Ltd., Osaka (JP)

(72) Inventors: Masahiro Ueda, Saga (JP); Kohei Yamaguchi, Saga (JP); Toshiyuki Kato, Saga (JP); Takashi Umemoto, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 18 days.

(21) Appl. No.: 17/677,121

(22) Filed: Feb. 22, 2022

(65) Prior Publication Data
US 2022/0310330 A1   Sep. 29, 2022

(30) Foreign Application Priority Data
Mar. 29, 2021  (JP) ................................ 2021-055714

(51) Int. Cl.
*H01G 9/15* (2006.01)
*H01G 9/00* (2006.01)
(Continued)

(52) U.S. Cl.
CPC ............. *H01G 9/15* (2013.01); *H01G 9/0032* (2013.01); *H01G 9/042* (2013.01);
(Continued)

(58) Field of Classification Search
CPC .... H01G 2009/05; H01G 9/0525; H01G 9/15; H01G 9/042; H01G 9/0032; H01G 9/07
See application file for complete search history.

(56) References Cited

U.S. PATENT DOCUMENTS

2003/0007318 A1* 1/2003 Kojima ................. H01G 11/56
361/510
2004/0213716 A1* 10/2004 Singh Gaur ............. C22B 3/26
423/64
(Continued)

FOREIGN PATENT DOCUMENTS

JP      55-014728 U    1/1980
JP      11-008166      1/1999
JP      2007081067 A * 3/2007

*Primary Examiner* — David M Sinclair
(74) *Attorney, Agent, or Firm* — Rimon P.C.

(57) ABSTRACT

An electrolytic capacitor includes a capacitor element that includes an anode body that has a porous structure, a dielectric layer disposed on a surface of the anode body, and a solid electrolyte layer that covers at least a part of the dielectric layer. The anode body contains a first group metal including at least one selected from the group consisting of tantalum, niobium, titanium, aluminum, and zirconium. The dielectric layer contains an oxide of the first group metal and a second group metal including at least one selected from the group consisting of iron, chromium, copper, silicon, molybdenum, sodium, and nickel. A ratio X of a total number of atoms of the second group metal to a total number of atoms of the first group metal in the dielectric layer is equal to or less than 100 ppm.

3 Claims, 3 Drawing Sheets

(51) Int. Cl.
*H01G 9/04* (2006.01)
*H01G 9/042* (2006.01)
*H01G 9/052* (2006.01)
*H01G 9/07* (2006.01)

(52) U.S. Cl.
CPC ............ *H01G 9/0525* (2013.01); *H01G 9/07* (2013.01); *H01G 2009/05* (2013.01)

(56) References Cited

U.S. PATENT DOCUMENTS

2009/0214378 A1* 8/2009 Haas .................. B22F 9/22
75/343
2019/0272958 A1* 9/2019 Sungail .................. B22F 1/052

* cited by examiner

ELECTROLYTIC CAPACITOR COMPRISING AN ANODE BODY HAVING A POROUS STRUCTURE AND CONTAINING A METAL

BACKGROUND

1. Technical Field

The present disclosure relates to an electrolytic capacitor and a method for manufacturing an electrolytic capacitor.

2. Description of the Related Art

An electrolytic capacitor includes an anode body and a dielectric layer formed on a surface of the anode body. In general, the dielectric layer is formed by anodizing (chemical conversion treatment) the surface of the anode body. In the related art, various anodization methods have been proposed.

Unexamined Japanese Patent Publication No. 11-8166 discloses a method for manufacturing a solid electrolytic capacitor in which after a solid electrolyte is formed in an anode body on which an oxide film is formed by anodizing a valve metal, a metal layer is formed by a re-anodizing treatment by immersing a plurality of anode bodies in a re-anodizing solution in which a flat-plate-shaped electrode is disposed and energizing between the anode body and the flat-plate-shaped electrode. This configuration proposes that the anode body is immersed in the re-anodizing solution and subjected to the re-anodizing treatment such that a shortest distance T1 between the anode bodies and a shortest distance T2 between the anode body and the flat plate electrode satisfy 0<T2/T1<5. This configuration describes that the flat-plate-shaped electrode is made of one of stainless steel, carbon, gold, and platinum.

Unexamined Japanese Utility Model Publication No. 55-14728 discloses an apparatus for manufacturing a tantalum electrolytic capacitor by using a tantalum metal as an anode substrate. This configuration proposes that after anodization for forming an anodic oxide film on an anode substrate is performed and a solid electrolyte layer such as manganese dioxide is formed on the anodic oxide film by thermal decomposition, a mesh-shaped or porous tantalum plate is used as a cathode plate of a anodizing apparatus that performs anodization for repairing the anodic oxide film.

SUMMARY

An electrolytic capacitor according to one aspect of the present disclosure includes a capacitor element that includes an anode body that has a porous structure, a dielectric layer disposed on a surface of the anode body, and a solid electrolyte layer that covers at least a part of the dielectric layer. The anode body contains a first group metal including at least one selected from the group consisting of tantalum, niobium, titanium, aluminum, and zirconium. The dielectric layer contains an oxide of the first group metal and a second group metal including at least one selected from the group consisting of iron, chromium, copper, silicon, molybdenum, sodium, and nickel. A ratio X of a total number of atoms of the second group metal to a total number of atoms of the first group metal in the dielectric layer is equal to or less than 100 ppm.

A method for manufacturing an electrolytic capacitor according to one aspect of the present disclosure includes preparing an anode body, electrically connecting the anode body to a first electrode for anodizing, and forming a dielectric layer by oxidizing at least a part of a surface of the anode body. The step of forming the dielectric layer is performed by applying a voltage between the first electrode and a second electrode in a state where the second electrode and the anode body that is electrically connected to the first electrode are immersed in an anodizing solution in an anodizing tank. The anode body contains a first group metal including at least one selected from the group consisting of tantalum, niobium, titanium, aluminum, and zirconium. A concentration on a mass basis of the second group metal containing at least one selected from the group consisting of iron, chromium, copper, silicon, molybdenum, sodium, and nickel in the anodizing solution is equal to or less than 0.03 ppm.

According to the present disclosure, the leakage current (LC) of the electrolytic capacitor can be reduced.

DETAILED DESCRIPTIONS OF EMBODIMENT

Figure 1:
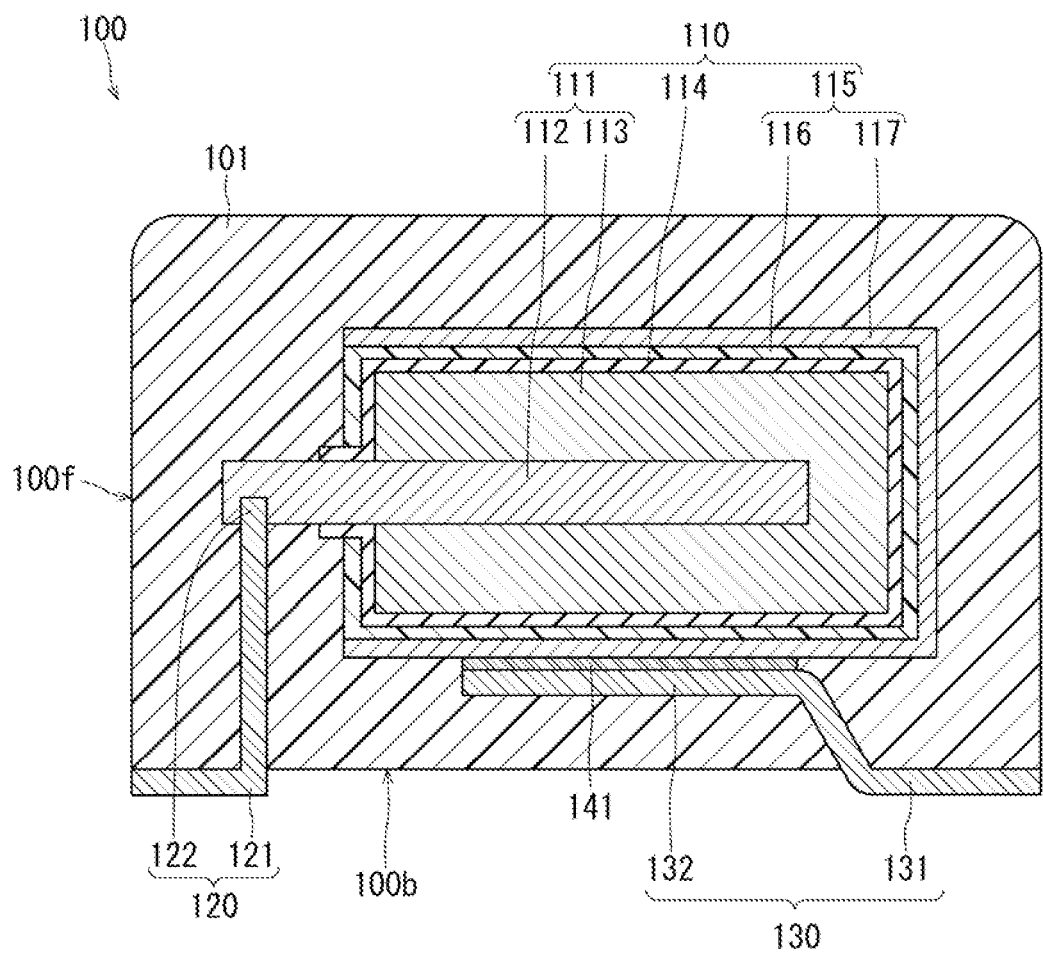
FIG. 1 is a sectional view schematically illustrating an example of an electrolytic capacitor according to the present disclosure.

The quality of the dielectric layer formed by performing the anodizing treatment on the surface of the anode body (anode substrate) influences the magnitude of a leakage current (LC). When impurities are contained into the dielectric layer, the LC tends to increase.

The anodizing treatment of the anode body is performed in a state where the anode body is immersed in the anodizing solution in an anodizing tank. When the impurities are contained in the anodizing solution, the impurities are easily contained into the dielectric layer.

However, in the related art, since the impurities in the anodizing solution are not sufficiently considered, there has been a problem that the impurities are contained into the dielectric layer. For example, the metal such as stainless steel is generally used for the anodizing tank. When the metal is used for the anodizing tank, it is found that metal ions are eluted in the anodizing solution and are finally contained into the dielectric layer.

Hereinafter, an exemplary embodiment of an electrolytic capacitor and a method for manufacturing an electrolytic capacitor according to the present disclosure will be described in conjunction with examples, but the present disclosure is not limited to the examples to be described below. In the following description, specific numerical values and materials may be provided as examples, but other numerical values and materials may be applied as long as the effect of the present disclosure can be obtained. In this specification, the description "numerical value A to numerical value B" includes a numerical value A and a numerical value B, and can be read as "equal to or more than numerical value A and equal to or less than numerical value B".

(Electrolytic Capacitor)

A type of an electrolytic capacitor according to the present disclosure is not particularly limited, and may be a solid electrolytic capacitor or a hybrid electrolytic capacitor containing a liquid and a solid electrolyte.

The electrolytic capacitor includes a capacitor element. The capacitor element includes an anode body that has a porous structure, a dielectric layer formed on a surface of the anode body, and a solid electrolyte layer that covers at least a part of the dielectric layer. The anode body may include a porous sintered body that is a sintered body of a metal powder, or may include a metal foil (anode foil) whose surface is roughened. The anode foil and a cathode foil may be wound with a separator interposed therebetween to form the capacitor element.

The anode body contains first group metal M1, and first group metal M1 contains a valve metal. The dielectric layer contains an oxide of first group metal M1. The dielectric layer may be an anodization coating film formed by anodizing (anodizing treatment) the anode body including first group metal M1. First group metal M1 may be at least one selected from the group consisting of tantalum (Ta), niobium (Nb), titanium (Ti), aluminum (Al), and zirconium (Zr).

Most of the anode body is formed by using first group metal M1. Meanwhile, the anode body may contain second group metal M2 as an impurity metal in addition to first group metal M1. A content of second group metal M2 contained in the anode body is, for example, equal to or less than 100 ppm, preferably equal to or less than 30 ppm on a mass basis.

Most of the dielectric layer contains an oxide of first group metal M1, that is, first group metal M1 and oxygen. Meanwhile, the dielectric layer contains second group metal M2 as an impurity metal in addition to first group metal M1. Second group metal M2 may be at least one selected from the group consisting of iron (Fe), chromium (Cr), copper (Cu), silicon (Si), molybdenum (Mo), sodium (Na), and nickel (Ni).

Here, in the dielectric layer, ratio X of a total number of atoms of the second group metal to a total number of atoms of the first group metal is equal to or less than 100 ppm. Ratio X may be obtained as a ratio OM2/OM1 of a content (OM2) of second group metal M2 contained in the dielectric layer to a content ratio (OM1) of first group metal M1 contained in the dielectric layer, and has a relationship of ratio X=OM2/OM1. The amount of second group metal M2 contained in the dielectric layer is small, and the dielectric layer is constituted by a high-purity oxide of the first group metal. A leakage current (LC) is remarkably suppressed by limiting ratio X to be equal to or less than 100 ppm. Ratio X may be equal to or less than 80 ppm, equal to or less than 50 ppm, or equal to or less than 30 ppm.

When second group metal M2 exists in the dielectric layer at a content exceeding the above range, a conductive path is formed in the dielectric layer that is an insulator, and thus the leakage current (LC) of the electrolytic capacitor easily occurs. It is considered that this phenomenon occurs because electrons are easily emitted into the dielectric layer due to generation of impurity levels in a band gap.

First group metal M1 contained in the anode body may be one kind or two or more kinds. First group metal M1 contained in the dielectric layer may be one kind or two or more kinds. When the dielectric layer is the anodization coating film formed by anodizing the anode body, first group metal M1 contained in the anode body and first group metal M1 contained in the dielectric layer are of the same kind.

Second group metal M2 that may be contained in the anode body may be one kind or two or more kinds. Second group metal M2 that may be contained in the dielectric layer may be one kind or two or more kinds. Second group metal M2 that may be contained in the anode body and second group metal M2 that may be contained in the dielectric layer may be of the same kind or different kinds. For example, second group metal M2 contained only in the dielectric layer may be present. Second group metal M2 may be contained into the dielectric layer due to various factors. Usually, the content of second group metal M2 that may be contained in the dielectric layer is larger than the content of second group metal M2 that may be contained in the anode body.

When a ratio of a total number of atoms of the second group metal to a total number of atoms of the first group metal in the anode body is defined as ratio Y, ratio X to ratio Y may be equal to or more than 1 time and equal to or less than 1.2 times. Ratio Y may be obtained as a ratio AM2/AM1 of a content (AM2) of second group metal M2 contained in the anode body to a content (AM1) of first group metal M1 contained in the anode body, and has a relationship of ratio Y=AM2/AM1. That is, X/Y=(OM2/OM1)/(AM2/AM1) may be equal to or more than 1 and equal to or less than 1.10 or equal to or more than 1 and equal to or less than 1.05.

Here, ratio X can be measured by, for example, inductively coupled plasma atomic emission spectroscopy (ICP). For example, the spectral intensities of first group metal M1 and second group metal M2 are measured by dissolving the dielectric layer in a heated acid solution (for example, hydrofluoric acid, a mixed acid of nitric acid and sulfuric acid), removing the solution residue by filtration, and then analyzing the resulting solution by ICP. Subsequently, a calibration curve is created by using a commercially available standard solution of first group metal M1 and second group metal M2, the content OM1 of first group metal M1 and the content OM2 of second group metal M2 contained in the dielectric layer are calculated, and ratio X=OM2/OM1 is calculated.

Ratio Y may be measured in the same manner as ratio X. For example, the spectral intensities of first group metal M1 and second group metal M2 are measured by dissolving the anode body in a heated acid solution, removing the solution residue by filtration, and then analyzing the resulting solution by ICP. Subsequently, a calibration curve is created by using a commercially available standard solution of first group metal M1 and second group metal M2, content AM1 of first group metal M1 and content AM2 of second group metal M2 contained in the anode body are calculated, and ratio Y=AM2/AM1 is calculated.

Ratio X may be obtained as follows. The spectral intensities of first group metal M1 and second group metal M2 are measured by totally dissolving the anode body having the dielectric layer in a heated acid solution, removing the solution residue by filtration, and then analyzing obtained solution A by ICP. Similarly, the spectral intensities of first group metal M1 and second group metal M2 are measured by totally dissolving the anode body from which the dielectric layer is removed in a heated acid solution, removing the solution residue by filtration, and then analyzing obtained solution B by ICP. Concentrations of first group metal M1 and second group metal M2 in each solution may be obtained by using the calibration curve, and ratio X=OM2/OM1 may be calculated by calculation by using the ratio of the dielectric layer to the anode body having the dielectric layer.

First group metal M1 may be, for example, only tantalum (Ta). In this case, a valve metal other than tantalum (Ta) is substantially not contained in the anode body and the dielectric layer. Here, the expression "substantially not contained" also includes a case where a valve metal other than tantalum (Ta) is contained in the anode body and the dielectric layer at a content equal to or less than a detection limit (for example, equal to or less than 1 ppb on a mass basis).

Second group metal M2 may be contained, for example, as an impurity in a powder of first group metal M1 that is a raw material of the anode body. Second group metal M2 may be eluted into an anodizing solution from, for example, an anodizing tank or the like having stainless steel or the like as a constituent member, and may be contained into the dielectric layer.

Second group metal M2 may be at least one selected from the group consisting of iron (Fe), chromium (Cr), and nickel (Ni). Iron (Fe), chromium (Cr), and nickel (Ni) are elements that are easily contained as impurities in the anode body and the dielectric layer.

Second group metal M2 may be only iron (Fe). Iron (Fe) is a representative example of second group metal M2, and is an element most easily contained, as an impurity, in the anode body and the dielectric layer. Iron (Fe) may be eluted into an anodizing solution from, for example, an anodizing tank or the like having stainless steel or the like as a constituent member, and may be contained into the dielectric layer.

An example of a case where the anode body is a sintered body (porous sintered body) of the powder of the first group metal will be described below as an example of the configuration and configuration elements of the electrolytic capacitor according to the present disclosure. The electrolytic capacitor to be described below includes a capacitor element, an exterior body, an anode lead terminal, and a cathode lead terminal. The configuration and configuration elements of the electrolytic capacitor according to the present disclosure are not limited to the following examples.

(Capacitor Element)

The capacitor element includes an anode portion, a dielectric layer, and a cathode portion. The anode portion includes an anode body and an anode lead. The dielectric layer is formed on a surface of the anode body. The cathode portion includes a solid electrolyte layer and a cathode lead-out layer. The solid electrolyte layer is disposed between the cathode lead-out layer and the dielectric layer formed on the surface of the anode body. These configuration elements are not particularly limited, and configuration elements used for known electrolytic capacitors may be applied.

(Anode body) The anode body may be formed by molding a powder of tantalum (Ta), niobium (Nb), titanium (Ti), aluminum (Al), zirconium (Zr), or the like that is the valve metal, or an alloy containing tantalum, niobium, titanium, aluminum, zirconium, or the like by using a mold or the like, and sintering the molded powder.

(Dielectric Layer)

The dielectric layer is formed on the surface of the anode body by an anodizing treatment. The anodizing treatment includes a process described in step (iii) of a method for manufacturing an electrolytic capacitor to be described later.

(Anode Lead)

The anode lead may be a wire, a ribbon, a foil, or the like made of metal. The material of the anode lead includes a valve metal, copper, and the like. The anode lead is partially embedded in the anode body, and the remaining part protrudes from an end face of the anode body.

(Solid Electrolyte Layer)

The solid electrolyte layer is not particularly limited, and solid electrolyte layers used for known electrolytic capacitors may be applied. The solid electrolyte layer may be a stacked body of two or more different solid electrolyte layers.

The solid electrolyte layer is disposed to cover at least a part of the dielectric layer. The solid electrolyte layer may be formed by using a manganese compound or a conductive polymer. Examples of the conductive polymer include polypyrrole, polythiophene, polyaniline, and derivatives thereof. These polymers may be used alone or in combination of a plurality of polymers. Alternatively, the conductive polymer may be a copolymer from two or more kinds of monomers. The derivative of the conductive polymer means a polymer having the conductive polymer as a basic skeleton. For example, examples of the derivative of polythiophene include poly(3,4-ethylenedioxythiophene) and the like.

It is preferable that a dopant be added to the conductive polymer. The dopant can be selected depending on the conductive polymer, and known dopants may be used. Examples of the dopant include naphthalenesulfonic acid, p-toluenesulfonic acid, polystyrenesulfonic acid, and salts thereof. An example of the solid electrolyte layer is formed by using poly(3,4-ethylenedioxythiophene) (PEDOT) doped with polystyrenesulfonic acid (PSS).

The solid electrolyte layer containing the conductive polymer may be formed by polymerizing a raw material monomer on the dielectric layer. Alternatively, the solid electrolyte layer may be formed by applying a liquid containing the conductive polymer (and the dopant as necessary) to the dielectric layer and then drying the liquid.

(Cathode Lead-Out Layer)

The cathode lead-out layer is a conductive layer and is disposed to cover at least a part of the solid electrolyte layer. The cathode lead-out layer may include a carbon layer formed on the solid electrolyte layer and a metal paste layer formed on the carbon layer. The carbon layer may be formed by a conductive carbon material such as graphite and resin. The metal paste layer may be formed by metal particles (for example, silver particles) and resin, and may be formed by, for example, a known silver paste.

(Cathode Lead Terminal and Anode Lead Terminal)

The cathode lead terminal includes a cathode terminal portion exposed from the exterior body of the electrolytic capacitor, and a connection portion connected to the cathode terminal portion. The connection portion is electrically connected to the cathode portion. For example, the connection portion may be connected to the cathode lead-out layer by a conductive layer (for example, a silver paste layer) or the like. The anode lead terminal includes an anode terminal portion exposed from the exterior body of the electrolytic capacitor, and a lead connection portion connected to the anode terminal portion. The lead connection portion is connected to the anode lead. Each lead terminal may be formed by, for example, processing a metal sheet (including a metal plate and a metal foil) made of a metal (copper, a copper alloy, or the like) by a known metal processing method.

(Exterior Body)

The exterior body is disposed around the capacitor element such that the capacitor element is not exposed on the surface of the electrolytic capacitor. The exterior body insulates the anode lead terminal from the cathode lead terminal. Thus, the exterior body is made of an insulating material. The method for forming the exterior body is not limited, and the exterior body may be formed by a known method. For example, the exterior body may be formed by disposing and curing the material of the exterior body to cover a part of the lead terminal and the capacitor element. Thus, the electrolytic capacitor is obtained.

FIG. 1 is a sectional view schematically illustrating an example of the electrolytic capacitor according to the present disclosure. Electrolytic capacitor 100 illustrated in FIG. 1 includes capacitor element 110, anode lead terminal 120, cathode lead terminal 130, exterior body 101, and conductive layer 141. Capacitor element 110 includes anode portion 111, dielectric layer 114, and cathode portion 115. Anode portion 111 includes anode body 113 and anode lead (anode wire) 112. Anode body 113 is a porous sintered body having a rectangular-parallelepiped shape, and dielectric layer 114 is formed on a surface of the anode body. A part of anode lead 112 protrudes from one end face of anode body 113 toward front surface 100$f$ of electrolytic capacitor 100. The other part of the anode lead is embedded in anode body 113.

Cathode portion 115 includes solid electrolyte layer 116 disposed to cover at least a part of dielectric layer 114, and cathode lead-out layer 117 formed on solid electrolyte layer 116. Cathode lead-out layer 117 includes, for example, a carbon layer formed on solid electrolyte layer 116 and a metal particle layer formed on the carbon layer. The metal particle layer is, for example, a metal paste layer (for example, a silver paste layer) formed by using a metal paste.

Anode lead terminal 120 includes anode terminal portion 121 and lead connection portion 122. Anode terminal portion 121 is exposed on bottom surface 100$b$ of electrolytic capacitor 100. Lead connection portion 122 is connected to anode lead 112. Cathode lead terminal 130 includes cathode terminal portion 131 and connection portion 132. Cathode terminal portion 131 is exposed on bottom surface 100$b$ of electrolytic capacitor 100. Connection portion 132 is electrically connected to cathode lead-out layer 117 by conductive layer 141.

Although a case where the porous sintered body is used as the anode body has been described above, the present disclosure may be applied to a wound electrolytic capacitor. The wound electrolytic capacitor includes an electrode plate group, a solid electrolyte, and a case. The electrode plate group includes a wound body, an anode lead, and a cathode lead. The wound body is formed by winding an anode body (metal foil), a separator, and a cathode foil. The anode lead is connected to the anode body (metal foil), and the cathode lead is connected to the cathode foil. The anode body is formed by using a metal containing a valve metal. The surface of the anode body is roughened or made porous, and the dielectric layer is formed on the surface. The separator is impregnated with the solid electrolyte. The wound electrolytic capacitor may contain a liquid such as an electrolyte solution. These configuration elements are not particularly limited, and known configuration elements used for the wound electrolytic capacitor may be used.

(Method for Manufacturing Electrolytic Capacitor)

A method for manufacturing an electrolytic capacitor includes the following steps (i) to (iii) in this order. In one aspect, the present disclosure provides an anodizing treatment method for forming the dielectric layer on the surface of the anode body. The anodizing treatment method includes the following steps (i) to (iii), and is performed by using an apparatus including an anodizing tank in which an anodizing treatment liquid is disposed, a first electrode, a second electrode, and a power source (for example, a DC power source). In the exemplary embodiment to be described below, configuration elements that are not essential to the method of the present disclosure may be omitted.

Here, an example of a manufacturing method (or an anodizing treatment method) when the anode body is the sintered body (porous sintered body) of the powder of the first group metal will be described.

(Step (i))

Step (i) is a step of preparing an anode body. Step (i) may be a step of preparing a plurality of anode portions each including an anode body and an anode lead protruding from a first end face of the anode body. The anode body and the anode lead are not limited, and known anode bodies and anode leads may be used. Alternatively, the anode portion may be produced by a known method.

The anode body contains first group metal M1 that is a valve metal. The anode body may be a sintered body of a molded body of a powder of first group metal M1. First group metal M1 may be at least one selected from the group consisting of tantalum (Ta), niobium (Nb), titanium (Ti), aluminum (Al), and zirconium (Zr). First group metal M1 may be, for example, only tantalum (Ta). That is, the anode body may be a sintered body of a tantalum (Ta) powder. In this case, a valve metal other than tantalum (Ta) is substantially not contained in the anode body and the dielectric layer.

Figure 2:
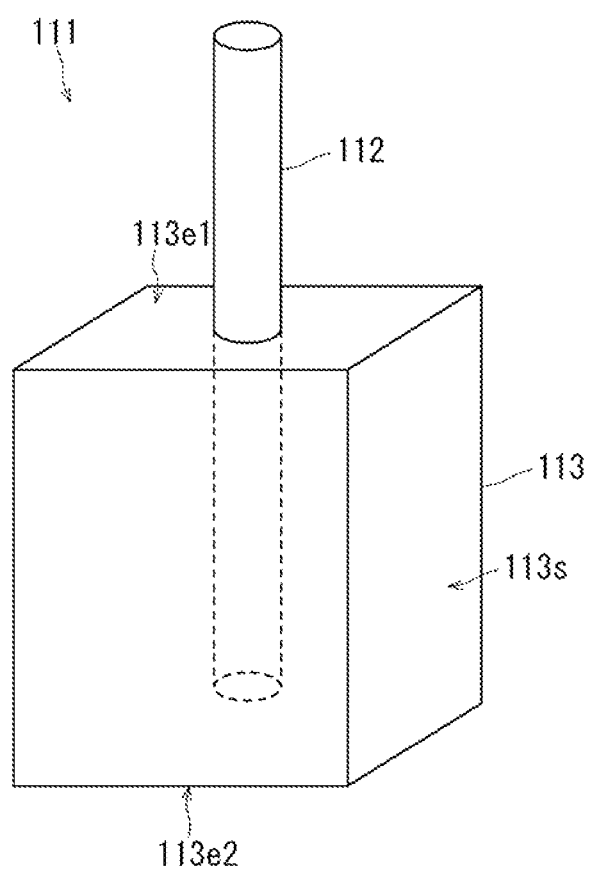
FIG. 2 is a perspective view schematically illustrating an example of an anode portion.

FIG. 2 illustrates an example of anode portion 111. Anode portion 111 includes anode body 113 and anode lead 112 protruding from first end face 113$e$1 of anode body 113. A surface of anode body 113 opposite to first end face 113$e$1 has second end face 113$e$2 and side surface 113$s$ connecting first end face 113$e$1 and second end face 113$e$2. Anode body 113 in the example illustrated in FIG. 2 has a substantially rectangular-parallelepiped shape, and has four side surfaces 113$s$.

(Step (ii))

Step (ii) is a step of electrically connecting the anode body to the first electrode for anodizing. Step (ii) may be, for example, a step of connecting a plurality of anode leads connected to a plurality of anode bodies to the first electrode for anodizing in a state where the plurality of anode bodies are arranged at intervals along a predetermined direction to form an anode body group. That is, in step (ii), for example, the anode leads of the plurality of anode portions are connected to the first electrode for anodizing in a state where the plurality of anode portions are arranged at intervals along a predetermined direction. The plurality of anode bodies may be arranged in a row or in a matrix.

A shape of the first electrode is selected according to the arrangement of the anode body group. For example, when the plurality of anode bodies are arranged in a row, the first electrode may have a linear shape (for example, a rod shape or a plate shape). When the plurality of anode bodies are arranged in a matrix, the first electrode may include a plurality of linear electrodes or may be a lattice-shaped electrode. The first electrode and the anode lead are electrically connected. Usually, the anode lead is fixed to the first electrode by a method such as welding. The material of the first electrode is not particularly limited, and may be a conductive metal (for example, iron, iron alloy, copper, copper alloy, aluminum, or the like). It is preferable that the first electrode is not brought into contact with the anodizing solution so as not to elute second group metal M2 into the anodizing solution.

The number of anode bodies included in the anode body group is not limited, and may range from 10 to 200, inclusive (for example, from 40 to 100, inclusive). An interval between adjacent anode bodies is also not particularly limited. The interval may range from 1 mm to 20 mm, inclusive (for example, from 2 mm to 6 mm, inclusive). Usually, the interval is constant, but the interval may not be constant.

Figure 3:
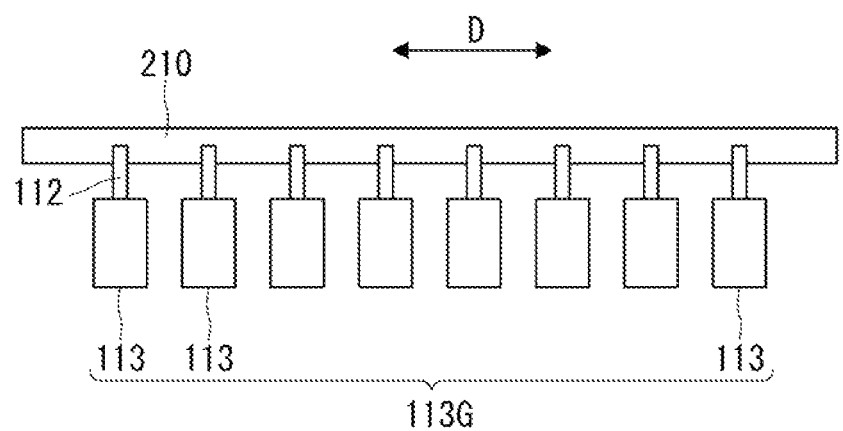
FIG. 3 is a diagram schematically illustrating an example of one step of a manufacturing method according to the present disclosure.

FIG. 3 illustrates an example of the anode body group. In anode body group 113G, the plurality of anode leads 112 connected to the plurality of anode bodies 113 are connected to first electrode 210 for anodizing in a state where the plurality of anode bodies 113 are arranged at intervals along predetermined direction D. In FIG. 3, the plurality of anode bodies 113 are arranged in a row. First electrode 210 is an elongated plate-shaped electrode extending linearly. Anode lead 112 is fixed and electrically connected to first electrode 210 by welding or the like.

(Step (iii))

Step (iii) includes a step of forming the dielectric layer by oxidizing at least a part of the surface of the anode body by applying a voltage between the first electrode and the second electrode in a state where the anode body electrically connected to the first electrode is immersed in the anodizing solution in the anodizing tank and the second electrode is immersed in the anodizing solution. Step (iii) may be, for example, a step of forming the dielectric layer by oxidizing at least a part of the surface of the anode body by applying a DC voltage between the first electrode and the second electrode in a state where the plurality of anode bodies connected to the first electrode via the anode lead are immersed in the anodizing solution. In step (iii), the second electrode is, for example, disposed to be in contact with the anodizing solution and along the anode body group.

In step (iii), the surface of the anode body is oxidized to be changed into the dielectric layer. For example, when the anode body is made of tantalum (Ta), a tantalum oxide layer is formed on the surface of the anode body. The anodizing solution is not particularly limited, and a known anodizing solution used for the anodizing treatment of the anode body of the electrolytic capacitor may be used. For example, any of an acidic aqueous solution, a neutral aqueous solution, and a basic aqueous solution may be used as the anodizing solution. Examples of the acidic aqueous solution include a phosphoric acid aqueous solution, a nitric acid aqueous solution, an acetic acid aqueous solution, and a sulfuric acid aqueous solution. Other examples of the anodizing solution include an aqueous solution of a tartrate, an aqueous solution of an oxalate, and an aqueous solution of a tetraborate.

Meanwhile, a concentration of second group metal M2 in the anodizing solution on the mass basis is controlled to be equal to or less than 0.03 ppm, and further to be equal to or less than 0.01 ppm. As a result of controlling the concentration of second group metal M2 in the anodizing solution on the mass basis to be equal to or less than 0.03 ppm, the dielectric layer may contain an oxide of a high-purity first group metal. That is, ratio X=OM2/OM1 can be limited to be equal to or less than 100 ppm.

When the concentration of second group metal M2 in the anodizing solution on the mass basis is calculated, at least one selected from the group consisting of iron (Fe), chromium (Cr), copper (Cu), silicon (Si), molybdenum (Mo), sodium (Na), and nickel (Ni) may be considered as second group metal M2. In this case, a total concentration of iron (Fe), chromium (Cr), copper (Cu), silicon (Si), molybdenum (Mo), sodium (Na), and nickel (Ni) in the anodizing solution on the mass basis is controlled to be equal to or less than 0.03 ppm, and further to be equal to or less than 0.01 ppm. Second group metal M2 may be at least one selected from the group consisting of iron (Fe), chromium (Cr), and nickel (Ni). In this case, a total concentration of iron (Fe), chromium (Cr), and nickel (Ni) in the anodizing solution on the mass basis is controlled to be equal to or less than 0.03 ppm, and further to be equal to or less than 0.01 ppm. Second group metal M2 may be only iron (Fe). In this case, a concentration of iron (Fe) in the anodizing solution on the mass basis is controlled to be equal to or less than 0.03 ppm, and further to be equal to or less than 0.01 ppm.

The second electrode is disposed to be in contact with the anodizing solution. For example, the second electrode may be immersed in the anodizing solution. It is preferable that a metal that is stable during anodizing be used as the material of the second electrode so as not to elute second group metal M2 into the anodizing solution. The material of the second electrode may be, for example, the first group metal, and may be at least one selected from the group consisting of tantalum (Ta), niobium (Nb), titanium (Ti), aluminum (Al), zirconium (Zr), platinum (Pt), gold (Au), nickel (Ni), carbon, and indium tin oxide (ITO). The second electrode may have a plate shape or a mesh shape.

From the same viewpoint, the material constituting the portion in contact with the anodizing solution is selected such that the second group metal is not eluted into the anodizing solution as much as possible. Such a material may be, for example, the first group metal, and it is preferable that at least one selected from the group consisting of tantalum (Ta), niobium (Nb), titanium (Ti), aluminum (Al), zirconium (Zr), nickel (Ni), carbon, and a non-metallic material be used. The non-metallic material may be resin, glass, or the like. At least a part of the anodizing tank may be used as the second electrode.

For example, the second electrode is disposed to face at least one surface selected from the second end face opposite to the first end face of the anode body (the end face from which the anode lead protrudes) and the side surface connecting the first end face and the second end face. For example, the second electrode may be disposed to face only the second end face of the anode body, may be disposed to face only the side surface of the anode body, or may be disposed to face both the second end face and the side surface of the anode body. When the second electrode is disposed to face the side surface of the anode body, the second electrode may be disposed to face only one side surface of the anode body group arranged. Alternatively, two second electrodes may be disposed to sandwich the anode body group. When electrodes (counter electrodes) paired with the first electrode are two or more electrodes, at least one of the electrodes is the second electrode having the above characteristics.

Figure 4:
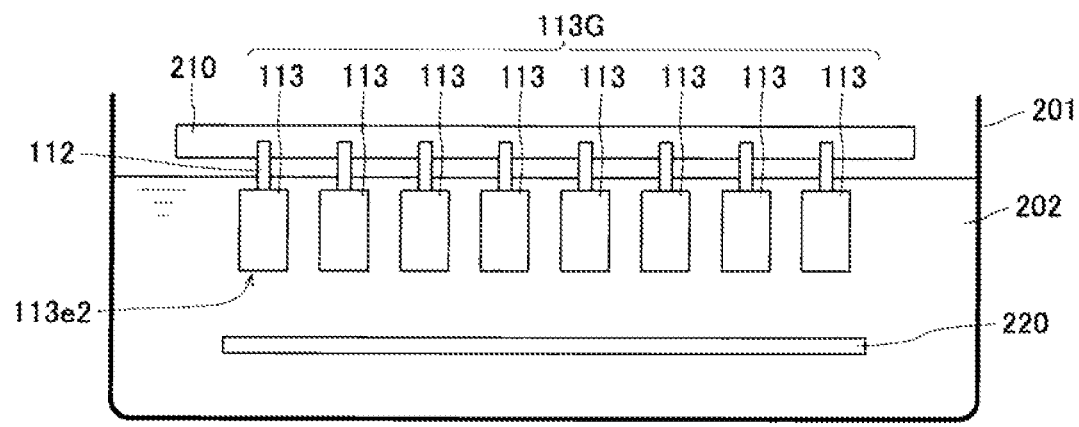
FIG. 4 is a diagram schematically illustrating an example of a step subsequent to the step in FIG. 3.

FIG. 4 illustrates an example of the apparatus including the anodizing tank, the first electrode, and the second electrode. In FIG. 4, the illustration of the power source is omitted. The plurality of anode bodies 113 are connected to first electrode 210 via anode lead 112, and are immersed, as anode body group 113G, in anodizing solution 202 in anodizing tank 201. Second electrode 220 is immersed in anodizing solution 202, and is disposed to face second end face 113e2 of anode body 113. Second electrode 220 is disposed along anode body group 113G. In this state, a DC voltage is applied between first electrode 210 and second electrode 220. Thus, at least a part of the surface of anode body 113 is oxidized to form dielectric layer 114. At this time, a part of the surface of anode lead 112 may also be oxidized.

The anode portion having the dielectric layer formed on the surface thereof is obtained by steps including steps (i) to (iii). Thus, in one aspect, the present disclosure provides a method for manufacturing the anode portion having the dielectric layer formed on the surface thereof. The manufacturing method includes steps (i) to (iii) described above.

After steps (i) to (iii), the electrolytic capacitor is obtained by performing a step of forming the portion necessary for the electrolytic capacitor. These steps are not limited, and a known method may be applied.

In a method for manufacturing an example of the electrolytic capacitor in which the anode body is the sintered body of the powder of the first group metal, the solid electrolyte layer is formed to cover at least a part of the dielectric layer, and the cathode lead-out layer is formed on the solid electrolyte layer. By doing this, the capacitor element is produced. Subsequently, the anode lead terminal is connected to the anode lead, and the cathode lead terminal is connected to the cathode lead-out layer. The exterior body is formed to cover the capacitor element, a part of the anode lead terminal, and a part of the cathode lead terminal. Thus, the electrolytic capacitor is obtained.

In a method for manufacturing an example of the electrolytic capacitor in which the anode body is the wound body of the metal foil, the wound body in which the anode body (metal foil), the separator, and the cathode foil are wound is prepared in step (i). The wound body includes the anode portion. The anode portion includes the anode body (metal foil) and the anode lead protruding from the first end face of the anode body (the first end face of the wound anode body). Usually, the dielectric layer is formed on the surface of the anode body (metal foil), but the dielectric layer is not formed on at least a part of the end face of the anode body. Thus, the dielectric layer is formed in the portion where the dielectric layer is not formed by the above steps (ii) and (iii). After the dielectric layer is formed, the capacitor element is produced by forming the solid electrolyte layer inside the wound body. The wound electrolytic capacitor is obtained by sealing the produced capacitor element in the case. The configuration elements and the method for forming the solid electrolyte layer are not particularly limited, and known configuration elements and forming methods may be used.

The present disclosure will be described in more detail by the following examples, but the following examples do not limit the present disclosure.

Example 1

(i) Production of Capacitor Element
(i-i) Step of Preparing Anode Body

A tantalum (Ta) powder was used as a valve metal. The tantalum (Ta) powder was molded into a rectangular-parallelepiped shape such that one end of a wire-shaped anode lead made of tantalum (Ta) was embedded in the tantalum (Ta) powder, and then the molded body was sintered in vacuum. As a result, an anode portion including the porous sintered body of tantalum (Ta) and an anode lead of which a part is embedded in the porous sintered body and the remaining part protrudes from an end face of the anode body was obtained.

(i-ii) Step of Connecting Anode Body to First Electrode 106 anode portions that have been produced were arranged in a row at regular intervals, and the anode lead was welded to an elongated plate-shaped first electrode.

(i-iii) Step of Forming Dielectric Layer

In a state where the anode portion where the anode lead was welded to the first electrode and a part of the anode lead were immersed in an anodizing solution in an anodizing tank made of glass as a whole and a second electrode made of tantalum (Ta) was immersed in the anodizing solution, a DC voltage was applied between the first electrode and the second electrode, and thus, a dielectric layer was formed by oxidizing a surface of the anode body. As the anodizing solution, a 0.06 mass % aqueous solution of nitric acid was used. A temperature of the anodizing solution was 60° C.

The DC voltage was 15 V and was applied for 10 hours. Thus, a uniform anodization coating film (thickness of about 30 nm) of tantalum oxide ($Ta_2O_5$) was formed as the dielectric layer on the surface of the anode body and a part of a surface of the anode lead.

(i-iv) Formation of Solid Electrolyte Layer

A solid electrolyte layer was formed on the dielectric layer by impregnating the anode body on which the dielectric layer was formed with a dispersion liquid containing polypyrrole for 5 minutes and drying the anode body at 150° C. for 30 minutes.

(i-v) Formation of Carbon Layer

After the dispersion liquid (carbon paste) in which carbon particles were dispersed in water was coated, a carbon layer was formed on a surface of the solid electrolyte layer by heating the solid electrolyte layer at 200° C.

(i-vi) Formation of Metal Paste Layer

A metal-paste containing silver particles, a binder resin, and a solvent was applied to a surface of the carbon layer. Thereafter, a capacitor element was obtained by heating the carbon layer at 200° C. and forming a silver paste layer.

(ii) Production of Electrolytic Capacitor

A conductive adhesive was further applied to the silver paste layer, and a cathode lead terminal and the silver paste layer were joined. The anode lead and an anode lead terminal were joined by resistance welding. Subsequently, electrolytic capacitor A1 was produced by accommodating the capacitor element to which each lead terminal was joined in a mold and sealing the capacitor element with a material of an exterior body (thermosetting resin composition) by a transfer molding method.

Examples 2 to 4

Electrolytic capacitors A2 to A4 of Example 2 to 4 were produced in the same manner as in Example 1 except that iron nitrate was dissolved in the anodizing solution to have an iron (Fe) concentration (ppm on a mass basis) represented in Table 1.

[Evaluations]
<Measurement of Leakage Current (LC)>

A voltage of 6.3 V was applied to produced electrolytic capacitors A1 to A4, and the LC after 40 seconds was measured. With the LC of electrolytic capacitor A4 using the anodizing solution of which the iron (Fe) concentration was 0.05 ppm is used as a reference value (100%), a relative value of the LC is represented in Table 1.

<Ratio X=Fe/Ta>

By the method described above, ratio X was calculated by measuring contents of tantalum (Ta) and iron (Fe) in the dielectric layer, and ratio Y was calculated by measuring contents of tantalum (Ta) and iron (Fe) in the anode body. X/Y was calculated from calculated ratio X and ratio Y. Table 1 shows results.

TABLE 1

| Capacitor | Fe concentration | Ratio X [ppm] | Ratio Y [ppm] | X/Y | LC (%) |
|---|---|---|---|---|---|
| A1 | 0 ppm | 80 | 80 | 1.00 | 11 |
| A2 | 0.01 ppm | 86 | 80 | 1.07 | 53 |
| A3 | 0.03 ppm | 100 | 80 | 1.25 | 92 |
| A4 | 0.05 ppm | 110 | 80 | 1.38 | 100 |

The present disclosure relates to an electrolytic capacitor and a method for manufacturing an electrolytic capacitor.

What is claimed is:

1. An electrolytic capacitor comprising a capacitor element,
the capacitor element including:
an anode body that has a porous structure,
a dielectric layer disposed on a surface of the anode body, and
a solid electrolyte layer that covers at least a part of the dielectric layer, wherein:
the anode body contains a first group metal including at least one selected from the group consisting of tantalum, niobium, titanium, aluminum, and zirconium,
the dielectric layer contains an oxide of the first group metal and a second group metal including at least one selected from the group consisting of iron, chromium, copper, silicon, molybdenum, sodium, and nickel,
a ratio X of a total number of atoms of the second group metal to a total number of atoms of the first group metal in the dielectric layer is equal to or less than 100 ppm, and
the ratio X is equal to or more than 1 time and equal to or less than 1.2 times with respect to a ratio Y of a total number of atoms of the second group metal to a total number of atoms of the first group metal in the anode body.

2. The electrolytic capacitor according to claim 1, wherein the second group metal is iron.

3. The electrolytic capacitor according to claim 2, wherein the first group metal is tantalum.

* * * * *